US008708253B2

(12) United States Patent
Hilfiker

(10) Patent No.: US 8,708,253 B2
(45) Date of Patent: Apr. 29, 2014

(54) HAND APPLICATION DEVICE

(75) Inventor: Thomas Hilfiker, Bünzen (CH)

(73) Assignee: Robatech AG, Muri (CH)

( * ) Notice: Subject to any disclaimer, the term of this patent is extended or adjusted under 35 U.S.C. 154(b) by 362 days.

(21) Appl. No.: 12/992,806

(22) PCT Filed: May 14, 2008

(86) PCT No.: PCT/EP2008/003869
§ 371 (c)(1),
(2), (4) Date: Feb. 10, 2011

(87) PCT Pub. No.: WO2009/138107
PCT Pub. Date: Nov. 19, 2009

(65) Prior Publication Data
US 2011/0127295 A1 Jun. 2, 2011

(51) Int. Cl.
*B05B 7/02* (2006.01)
*B05B 9/01* (2006.01)
*B24B 23/00* (2006.01)
*B24B 27/08* (2006.01)
*B23B 45/00* (2006.01)

(52) U.S. Cl.
USPC ............ 239/525; 239/526; 451/358; 173/170

(58) Field of Classification Search
USPC ....... 239/DIG. 14, 375, 273, 525–531; 222/1, 222/146.2, 469; 16/421, DIG. 14; 451/918; 81/177.8; 173/170
See application file for complete search history.

(56) References Cited

U.S. PATENT DOCUMENTS

| | | | | |
|---|---|---|---|---|
| 4,099,653 | A * | 7/1978 | Scholl et al. | 222/146.5 |
| 4,245,759 | A * | 1/1981 | Baker et al. | 222/146.5 |
| 4,508,276 | A * | 4/1985 | Malcolm | 239/691 |
| 4,616,782 | A * | 10/1986 | Marietta et al. | 239/752 |
| 4,773,566 | A * | 9/1988 | Hoagland | 222/146.5 |
| 5,047,612 | A * | 9/1991 | Savkar et al. | 219/121.47 |
| 6,412,662 | B1 | 7/2002 | Bryan et al. | |
| 7,303,028 | B2 * | 12/2007 | Wu | 173/170 |
| 7,318,486 | B2 * | 1/2008 | Andriolo et al. | 173/170 |
| 7,540,335 | B2 * | 6/2009 | Andriolo et al. | 173/18 |
| 2004/0123659 | A1 * | 7/2004 | Merwin | 73/304 R |
| 2006/0025060 | A1 * | 2/2006 | Funk | 451/358 |
| 2007/0212989 | A1 * | 9/2007 | Henke et al. | 451/344 |
| 2008/0012307 | A1 * | 1/2008 | Taillon | 285/282 |

FOREIGN PATENT DOCUMENTS

WO WO 2004093939 A2 11/2004

* cited by examiner

*Primary Examiner* — Len Tran
*Assistant Examiner* — Alexander M Valvis
(74) *Attorney, Agent, or Firm* — Browdy and Neimark, PLLC

(57) ABSTRACT

The invention relates to a hand application device (1) having improved handling capability, in that its individual elements (2, 7, 12) are rotatable and adjustable to one another around four rotational axes (8, 10, 13, 28).

16 Claims, 6 Drawing Sheets

HAND APPLICATION DEVICE

Figure 1:
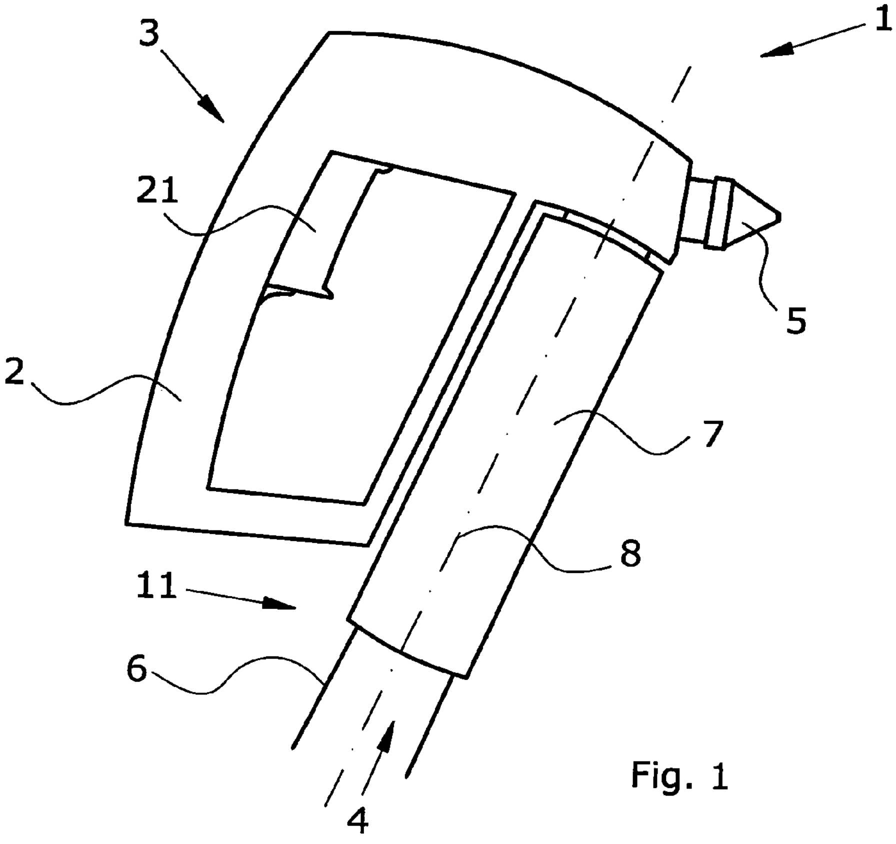

The invention relates to a hand application device having a handle and a controller for varying the flow rate of a liquid or viscous material through a nozzle, for example, for applying or spraying on adhesive.

Such devices are often conceived for complex gluing work or continuous industrial use and must thus meet high demands with respect to ergonomics, handiness, and manifold usability.

The applicant of the present application has put a hand application device on the market under the name Ecoline, which provides an attachment for one end of a supply hose. See under www.mkhotmelt.fi/robatech tuotteet/sulateliimalaitteet/sulateliimalaitteet 1/e site ecoline 3.pdf. A handle is fastened on the front side of this attachment, which has a nozzle at an approximately 100° angle from the body axis of the supply hose and the attachment positioned thereon. Furthermore, this known hand application device has a controller for varying the flow rate of the nozzle.

In specific applications, however, it has been shown that the ergonomics, the handiness, and in particular the adaptation possibilities of this known hand application device are restricted and capable of improvement.

Experiments have shown that a placement of the nozzle in the extension of the body axis of the supply hose in combination with a configuration of the handle, which is mounted so it is rotatable and adjustable, at an approximately right angle to the body axis of the supply hose achieves the stated object. The rotatable mounting of the handle is performed using a rigid pivot bearing, however, a preferred design variant provides a ball-and-socket joint or spherical bearing instead of a rigid pivot bearing. Such a bearing also offers lateral adjustment possibilities in addition to the rotation.

A rotatably mounted fastening of an approximately semicircular bracket having a corresponding guide results in a further advantageous rotation-adjustment capability around a second rotational axis. A rotatable mounting of a correspondingly designed handle results in a third rotation-adjustment capability around a third rotational axis, namely around the body axis of the handle itself. A hand application device designed according to the invention in this manner can be supplemented by a fourth rotational-adjustment capability of the attachment on the front side of the supply hose. Manifold adaptation possibilities to various work conditions, applications, and space relationships, better reachability of poorly accessible adhesive surfaces, and also improved avoidance of adhesive drops on the hand and more economical handling of the adhesive therefore result. A further advantage is that a heating element can be placed in the attachment and the heat can hardly be transmitted at all to the handle.

All pivot bearings may optionally be provided with a lock.

Furthermore, the configuration of the individual elements of a hand application device according to the invention opens up possibilities for the configuration or integration of novel and inventive controllers of the flow rate of the nozzle.

A first controller according to the invention provides that the handle has a finger trigger. This can optionally be designed not only for one finger, but rather for two or even more fingers for improved ergonomics. It is preferably spring-loaded and causes, for example, a small quantity of adhesive to flow through the nozzle in the case of lighter pressure actuation and a greater quantity in the case of stronger pressure actuation. However, applications are also conceivable in which a reversed controller can be advisable. In any case, a circuit (such as a DC circuit), which is connected to the finger trigger, is provided in this first controller according to the invention. Pressure actuations of the finger trigger cause the generation of an electrical control signal, using a variable resistor, as the manipulated variable for the further control process. A resistor having sliding contacts, a potentiometer, a resistor having sliding contacts having "off" position, or also a voltage-dependent resistor, a so-called varistor, also come into consideration as the variable resistor. The control signal generated by the variable resistor then controls a valve, as a function of the position of the finger trigger. This valve is electrically activatable, i.e., a solenoid valve, for example. All conceivable types of valve come into consideration for the construction of this valve, such as needle valves, ball valves, diaphragm valves, stopcock valves. This valve in turn controls the flow rate of the adhesive through the nozzle.

A second controller according to the invention functions optoelectrically. This can be performed using a so-called optocoupler, fundamentally, however, a light source is excited more or less depending on the position of the finger trigger and accordingly a photodiode or a photo transistor receives a corresponding radiation quantity. In order to prevent external light influences from corrupting the control signal, transmission of the radiation quantity using an optical waveguide is preferred. The corresponding radiation quantity in turn generates a control signal for a control valve of the nozzle, as described above.

A third controller according to the invention combines an electrical circuit with a pneumatic circuit. In this case a solenoid control valve is activated so that the compressed air or liquid which is conducted through this solenoid control valve is varied as a function of the finger trigger actuation. A further valve, preferably a sequence valve or pressure control valve, and thus in turn the flow rate quantity of adhesive through the nozzle, can thus in turn be activated.

A fourth controller functions mechanically using springs and a check valve controlled by spring force—which is also spring-loaded.

The four presented controllers are combinable with one another. Thus, for example, a direct activation of a hydraulic pump and thus the positioning valve of the nozzle using the electrical signal from the finger trigger is also conceivable. Vice versa, however, integration of the finger trigger in a pneumatic circuit can also be implemented, so that a control valve moves mechanically and this mechanical movement influences the positioning valve of the nozzle.

The controllers disclosed up to this point describe a finger trigger. However, a hand application device according to the invention can also have a foot controller or a mouth controller for controlling the delivery of the adhesive. Such a controller can be advisable in particular if both hands are required during gluing.

The transmission of the control signal to the positioning valve for the variation of the flow rate of the nozzle can be performed via a cable, or also in a contactless manner, for example, as an IR or radio signal. Transmissions via optical waveguides, as mentioned above, also come into consideration.

Further embodiments of the invention are specified in the figures and in the dependent patent claims.

The list of reference numerals is part of the disclosure.

The invention is explained in greater detail for symbolic and exemplary purposes on the basis of figures.

The figures are described in coherent and comprehensive form. Identical reference numerals identify identical components, reference numerals having different indices specify functionally-identical or similar components.

Figure 2:
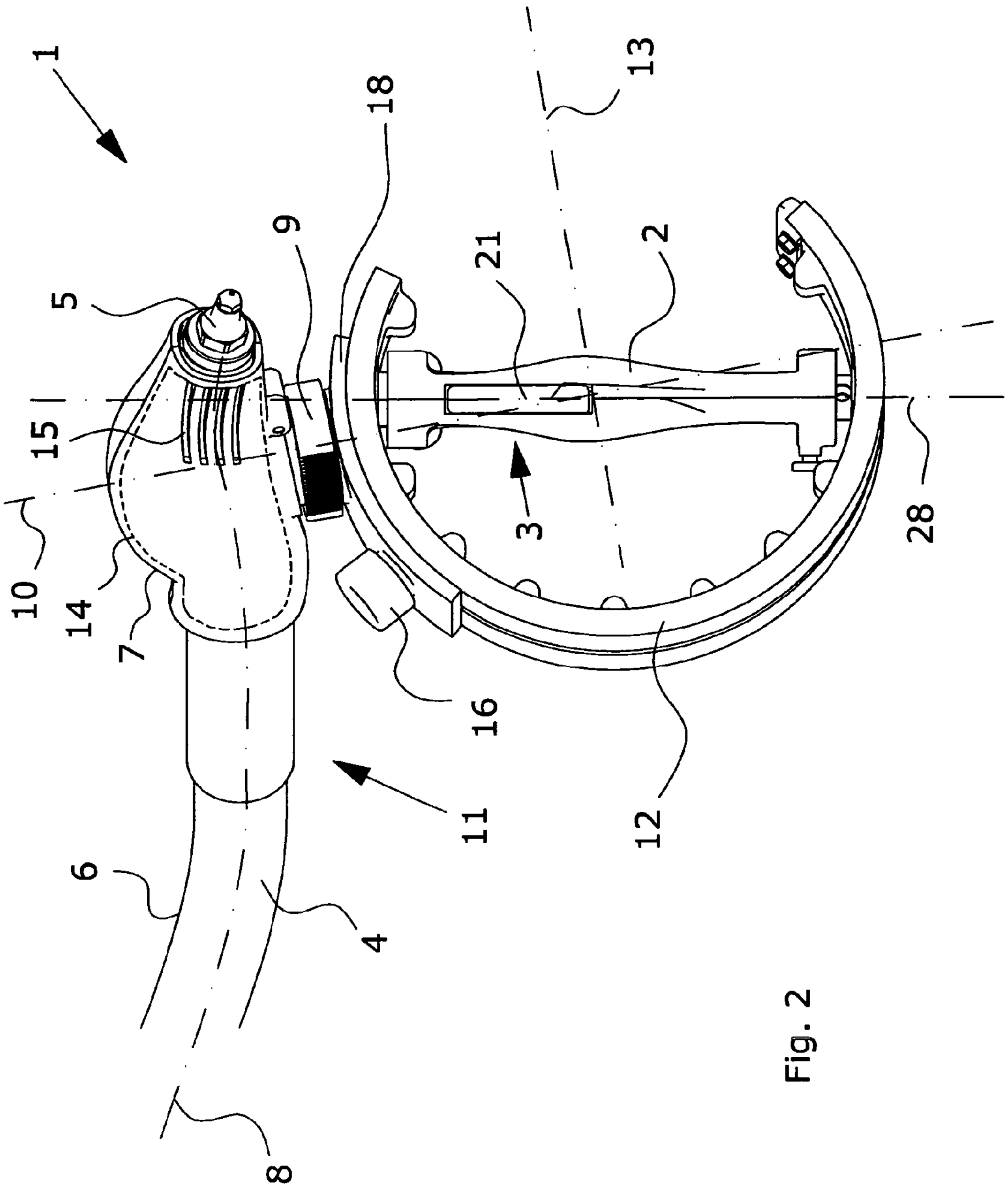
Figure 3:
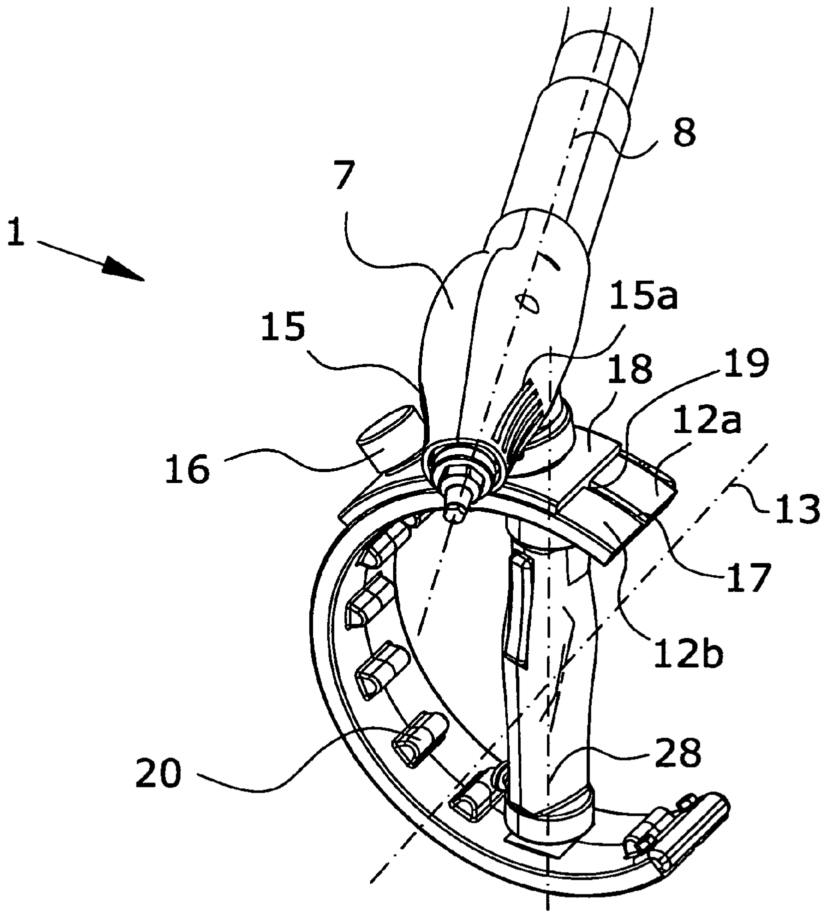
Figure 4:
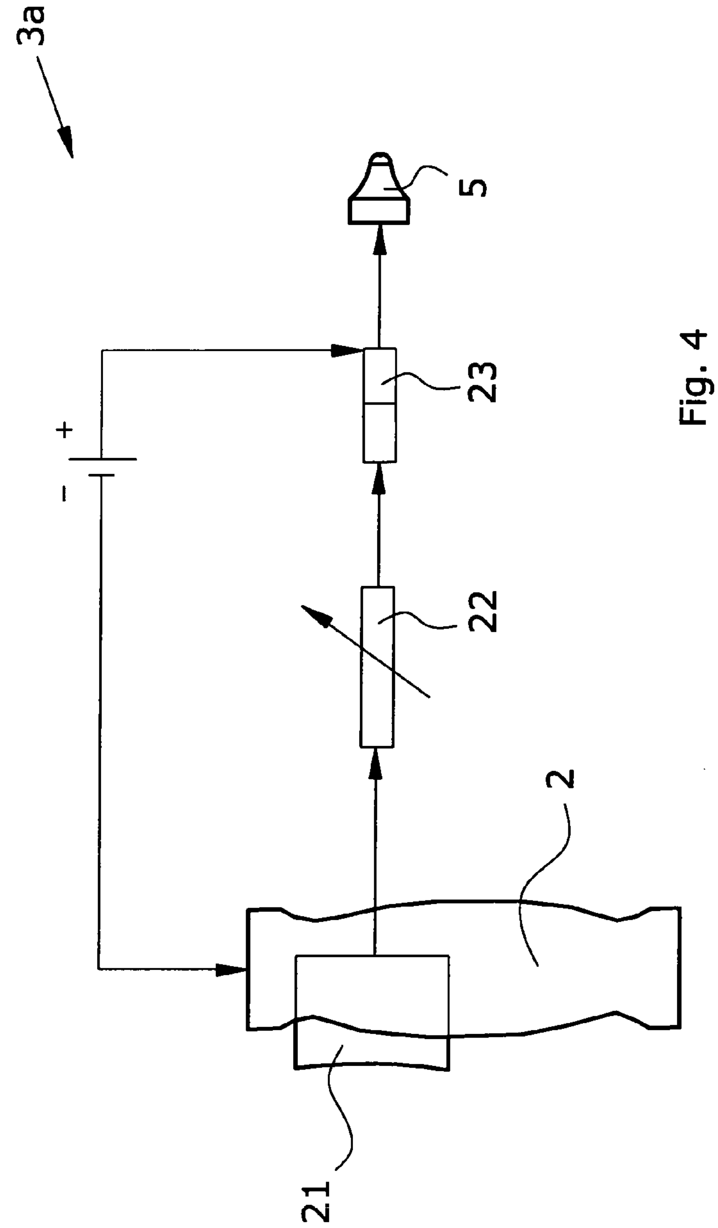
Figure 5:
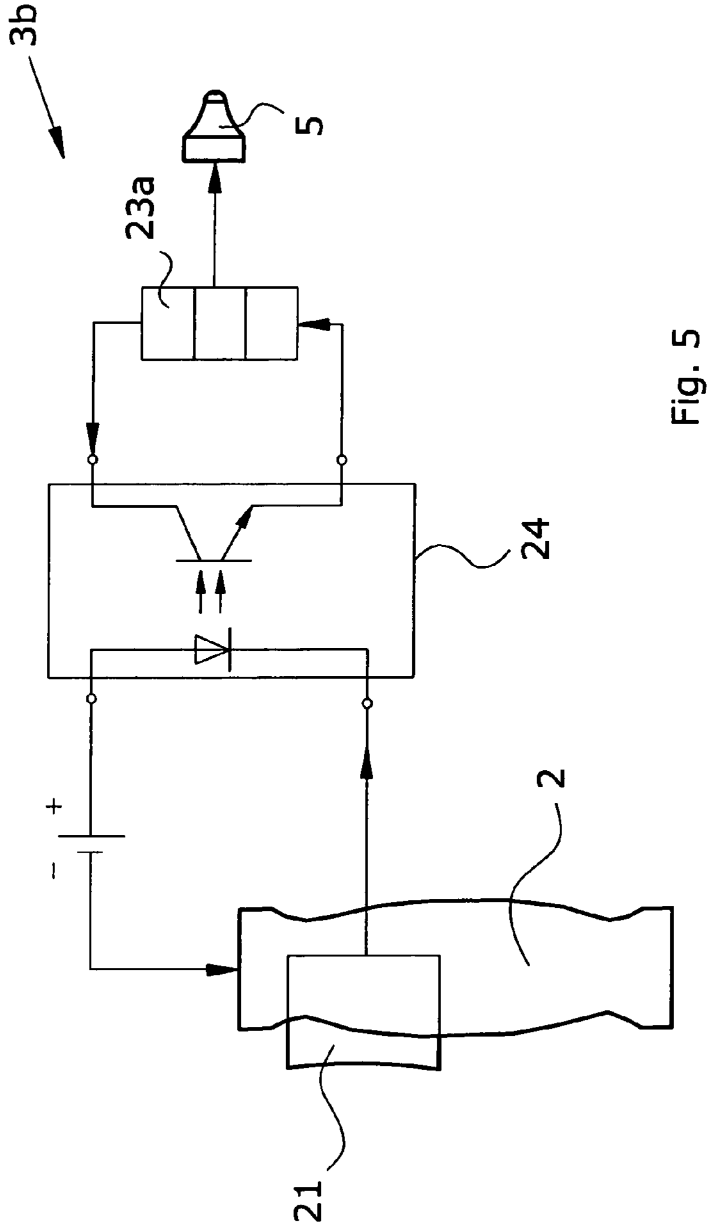
Figure 6:
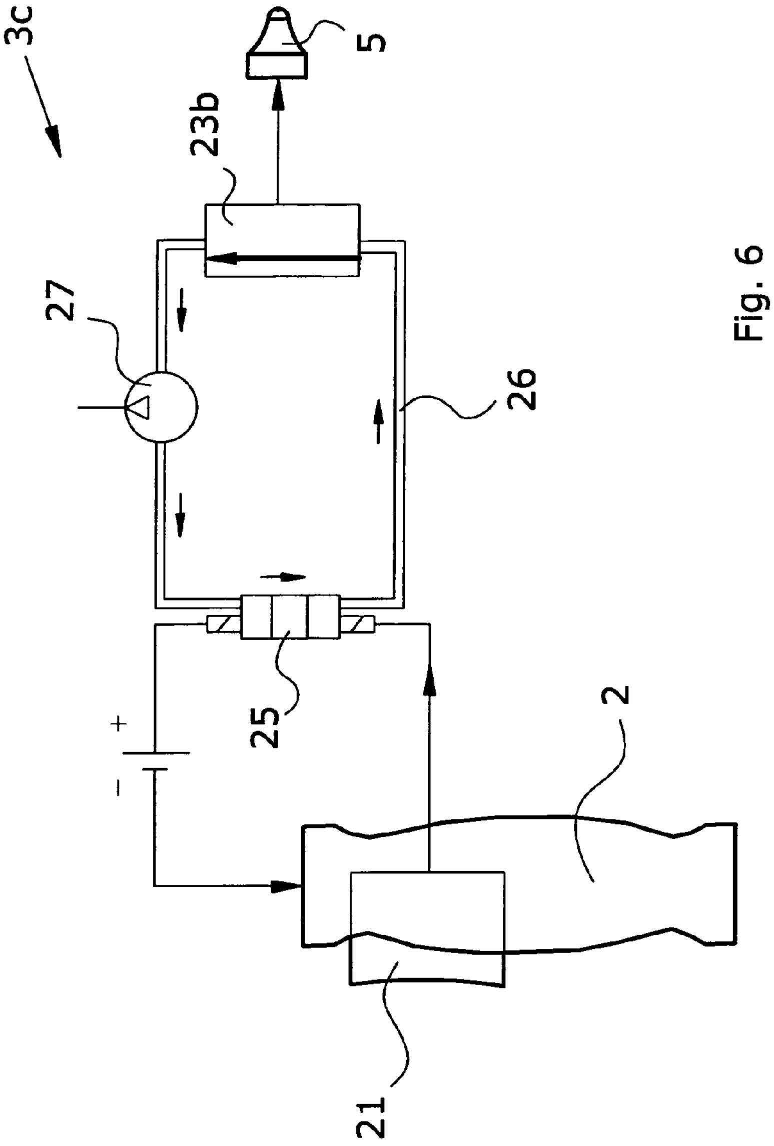

In the figures:

FIG. 1—shows a hand application device according to the prior art;

FIG. 2—shows a hand application device according to the invention;

FIG. 3—shows another view of the hand application device according to the invention shown in FIG. 2;

FIG. 4—shows a circuit diagram of a controller according to the invention of a hand application device according to the invention having a potentiometer;

FIG. 5—shows a further circuit diagram of a controller according to the invention for a hand application device according to the invention having an optocoupler, and FIG. 6—shows a further circuit diagram of a controller according to the invention for a hand application device according to the invention having an electrical circuit and a pneumatic circuit.

FIG. 1 shows a hand application device 1 according to the prior art. It comprises a supply hose 6 having a body axis 8. Liquid material 4, such as liquid adhesive, is supplied to the hand application device 1 through the supply hose 6. At one end 11 of the supply hose 6, an attachment 7 is situated. A handle 2, which has a controller 3 using a finger trigger 21, is in turn seated on the attachment 7. The controller 3—depending on the position of the finger trigger 21—is used for varying the flow rate of the liquid material 4 through a nozzle 5.

FIG. 2 shows a hand application device 1 according to the invention in which the attachment 7 is situated on the end 11 of the supply hose 6 so that the nozzle 5 comes to rest in extension of the body axis 8 of the supply hose 6. The attachment 7 optionally houses a heating element 14 (symbolically shown using dashed lines) and can have cooling slots 15. A pivot bearing 9 is situated on the lower side of the attachment 7, which allows rotations of an approximately semicircular bracket 12 fastened thereon around a rotational axis 10, which is approximately perpendicular to the body axis 8 of the supply hose 6. The pivot bearing 9 is optionally lockable. The bracket 12 is in turn mounted on a curved guide plate 18 so that it can describe rotations guided thereon along its circumference around a bracket rotational axis 13. The guide plate 18 has a locking screw 16, using which the bracket 12 can be fixed in an arbitrary position. Furthermore, the bracket 12 is the mount for the handle 2 using two pivot bearings. The handle is in turn rotatable and optionally fixable around a further rotational axis, namely around a handle body axis 28.

FIG. 3 shows another view of the hand application device 1 according to the invention from FIG. 2. It is obvious in this case that the attachment 7 has cooling slots 15 and 15*a* on both sides. The bracket 12 in turn comprises two bracket halves 12*a* and 12*b*, which form a slot 17. A spring 19, which forms the lower side of the guide plate 18, runs in the screw slot 17. The two bracket halves 12*a* and 12*b* are held together by fasteners 20.

FIG. 4 shows a circuit diagram for a controller 3*a* according to the invention of a hand application device 1 according to the invention as shown in FIG. 2 or FIG. 3. The circuit diagram shows for symbolic and exemplary purposes that a DC power source generates a current flow from the negative pole to the positive pole. By actuating the finger trigger 21 on the handle 2, a variable resistor or potentiometer 22 generates a control signal as the manipulated variable for a valve 23. Resistors having sliding contacts or resistors having an "off" position or voltage-dependent resistors, so-called varistors, also come into consideration as the variable resistor or potentiometer 22. The valve 23 varies the flow rate of the nozzle 5.

FIG. 5 shows a circuit diagram for a further controller 3*b* according to the invention for a hand application device 1 according to the invention as shown in FIG. 2 or FIG. 3. In this case, an optocoupler 24 is excited by actuations of the finger trigger 21 so that it adjusts an electrically variable valve 23*a*, which in turn varies the flow rate of the nozzle 5.

FIG. 6 shows a circuit diagram for a further controller 3*c* according to the invention for a hand application device 1 according to the invention as shown in FIG. 2 or FIG. 3. In this case, actuations of the finger trigger 21 act on an electromagnetic control valve 25, which varies the flow rate in a pneumatic circuit 26. A pneumatic pump or a compressor 27 ensures a flow of compressed air or liquid in a direction so that the electromagnetic control valve 25 first has flow through it and therefore—depending on its setting as a result of the finger trigger position—controls a sequence valve or pressure control valve 23*b*. This in turn varies the flow rate of the nozzle 5.

LIST OF REFERENCE NUMBERS

1—hand application device
2—handle
3, 3*a*-3*c*—controller
4—liquid material, adhesive
5—nozzle
6—supply hose
7—attachment
8—body axis of 6
9—pivot bearing
10—rotational axis
11—end of 6
12—bracket
12*a*, 12*b*—bracket halves
13—bracket rotational axis
14—heating element
15, 15*a*—cooling slots
16—locking screw
17—groove
18—guide plate
19—spring
20—fastener
21—finger trigger
22—potentiometer
23, 23*a*-23*c*—valve for varying the flow rate of 5
24—optocoupler
25—solenoid control valve
26—pneumatic circuit
27—compressor
28—handle body axis

The invention claimed is:

1. Hand application device (1) having a handle (2) and a controller (3) for varying the flow rate of a liquid material (4) through a nozzle (5), having a supply hose (6) having a body axis (8) and an attachment (7) on one end (11) of the supply hose (6), wherein the nozzle (5) is situated on the attachment (7) in extension of the body axis (8) of the supply hose (6), and the handle (2) is mounted so it is rotatable in a pivot bearing (9), whose pivot bearing rotational axis (10) is situated in an angle range of 45° to 135°, to the body axis (8), wherein an approximately semicircular bracket (12) is situated between the pivot bearing (9) and the handle (2), the semicircular bracket (12) being mounted so as to provide the handle (2) a rotation around a bracket rotational axis (13), the bracket rotational axis (13) being situated approximately perpendicularly to the pivot bearing rotational axis, wherein handle (2) is mounted so it is rotatable in the approximately semicircular bracket (12) around a handle body axis (28).

2. Hand application device (1) according to claim 1, wherein the attachment (7) on the end (11) of the supply hose (6) is mounted so it is rotatable around the body axis (8) of the supply hose (6).

3. Hand application device (1) according to claim 2, wherein at least one of the following is lockable: the rotation around the pivot bearing rotational axis (10), the rotation around the bracket rotational axis (13), the rotation of the handle (2) around its body axis (28), and the rotation of the attachment (7) around the body axis (8) of the supply hose (6).

4. Hand application device (1) according to claim 1, wherein the pivot bearing (9) is a spherical bearing or a ball-and-socket joint.

5. Hand application device (1) according to claim 1, wherein a heating element (14) is situated in the attachment (7).

6. Hand application device (1) according to claim 1, wherein the controller (3) comprises a finger trigger (21), which is situated in the handle (2), a mechanical spring configuration, and a spring-loaded check valve (23*c*) having a valve spring for varying the flow rate of the nozzle (5), more or less tensile force being transmittable to the valve spring depending on the position of the finger trigger (21).

7. Hand application device (1) according to claim 1, wherein the controller (3) comprises a finger trigger (21), which is situated in the handle (2), a potentiometer (22), and a valve (23) for varying the flow rate of the nozzle (5), an electrical control signal for the valve (23) being able to be output by the potentiometer (22) depending on the position of the finger trigger (21).

8. Hand application device (1) according to claim 1, wherein the controller (3) comprises a finger trigger (21), which is situated in the handle (2), an optocoupler (24), and a valve (23*a*) for varying the flow rate of the nozzle (5), an electrical control signal for the valve (23*a*) being able to be output by the optocoupler (24) depending on the position of the finger trigger (21).

9. Hand application device (1) according to claim 1, wherein the controller (3) comprises a finger trigger (21), which is situated in the handle (2), a solenoid control valve (25), and a pneumatic valve (23*b*) for varying the flow rate of the nozzle (5), the pneumatic pressure in the valve (23*b*) being variable by the solenoid control valve (25) depending on the position of the finger trigger (21).

10. Hand application device (1) according to claim 7, wherein the controller (3) comprises a foot pedal.

11. Hand application device (1) according to claim 8, wherein the control signal for the valve (23) for varying the flow rate of the nozzle (5) is transmittable in a contactless manner, for example, via IR or radio.

12. A method of applying or spraying on an adhesive (4) using the hand application device (1) according to claim 1.

13. Hand application device (1) according to claim 1, wherein the pivot bearing rotational axis (10) is situated at an angle of approximately 90° to the body axis (8).

14. Hand application device (1) according to claim 8, wherein the control signal for the valve (23) for varying the flow rate of the nozzle (5) is transmittable in a contactless manner via IR or radio.

15. Hand application device (1) according to claim 9, wherein the control signal for the valve (23) for varying the flow rate of the nozzle (5) is transmittable in a contactless manner via IR or radio.

16. Hand application device (1) according to claim 10, wherein the control signal for the valve (23) for varying the flow rate of the nozzle (5) is transmittable in a contactless manner via IR or radio.

* * * * *